United States Patent [19]
Lapinskas

[11] 3,924,819
[45] Dec. 9, 1975

[54] ELECTRICAL UTILITY CORD STORAGE AND SHORTENING DEVICE

[76] Inventor: Edward F. Lapinskas, 4315 S. Harlem Ave., Stickney, Ill. 60402

[22] Filed: June 11, 1974

[21] Appl. No.: 478,218

[52] U.S. Cl. .............................................. 242/85.1
[51] Int. Cl.² ......................................... B65H 75/36
[58] Field of Search ............. 242/85.1, 125.1, 125.2, 242/129, 96; 191/12 R, 12.2 R, 12.4; 24/71.2, 71.3, 129 B, 130

[56] References Cited
UNITED STATES PATENTS

| 1,178,056 | 4/1916 | Craig | 242/85.1 |
|---|---|---|---|
| 1,408,261 | 2/1922 | Brookhart | 242/85.1 |
| 1,579,886 | 4/1926 | Oxner | 242/125.2 X |
| 2,265,126 | 12/1941 | Bersche | 242/125.2 |
| 2,587,707 | 3/1952 | Dever | 242/85.1 |

FOREIGN PATENTS OR APPLICATIONS

| 526,886 | 11/1920 | France | 242/125.2 |
|---|---|---|---|

Primary Examiner—Edward J. McCarthy
Attorney, Agent, or Firm—Johnson, Dienner, Emrich & Wagner

[57] ABSTRACT

A spool-like device is adapted for use in wrapping, storing, and shortening utility cord or the like. The spool-like device embodies a generally elongated and longitudinally extending hub member having an outer peripheral surface upon which the cord is adapted to be wrapped. Connected to the hub member are generally transversely extending retaining members located adjacent each end thereof and arranged to project generally radially outwardly from the outer peripheral surface by a distance sufficient to contain at least one winding of wrapped cord. Releasable fastening devices are also provided and are located adjacent the ends of the hub member for detachably and firmly securing the cord adjacent the ends of the hub member.

4 Claims, 4 Drawing Figures

U.S. Patent    Dec. 9, 1975    3,924,819
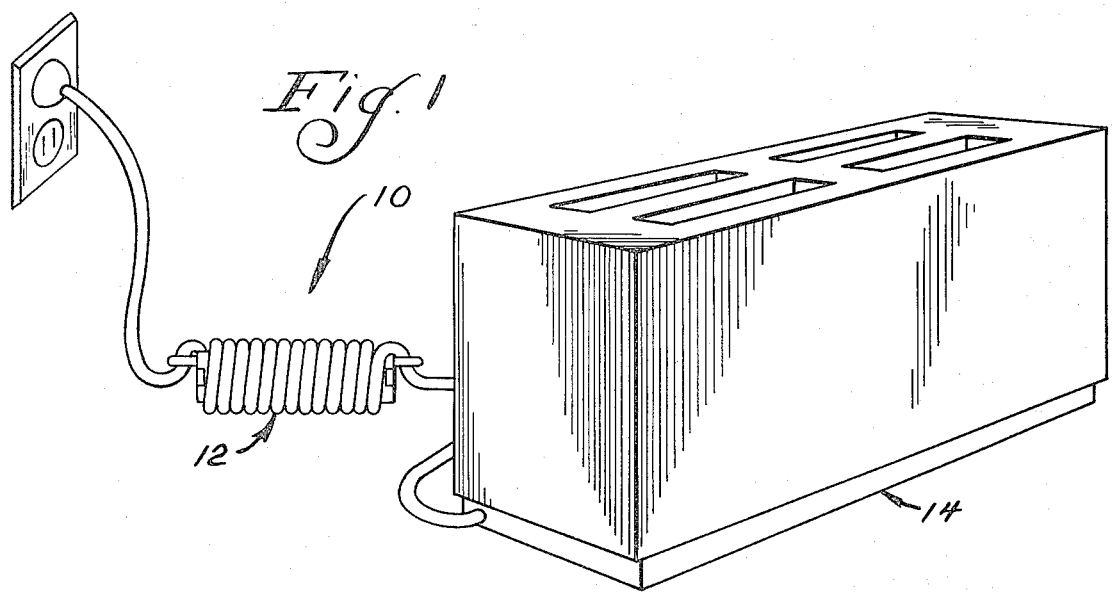
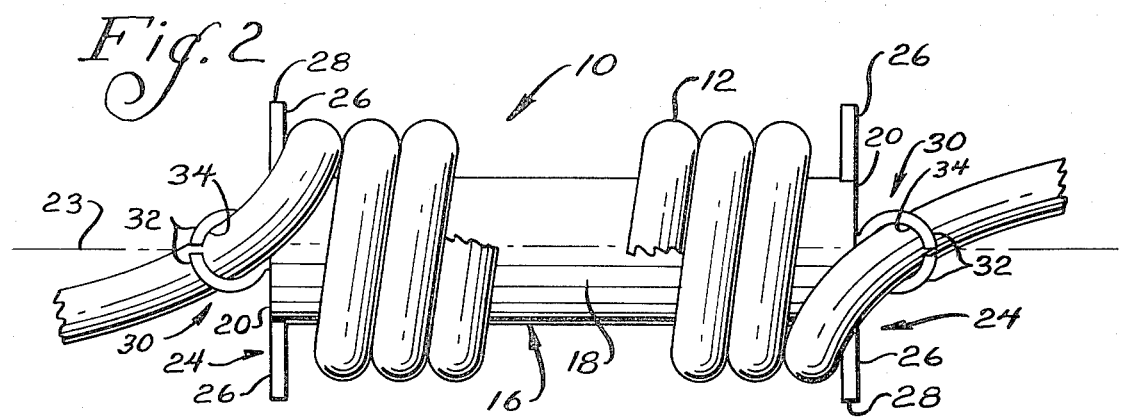
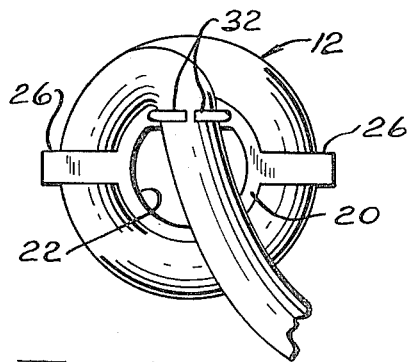
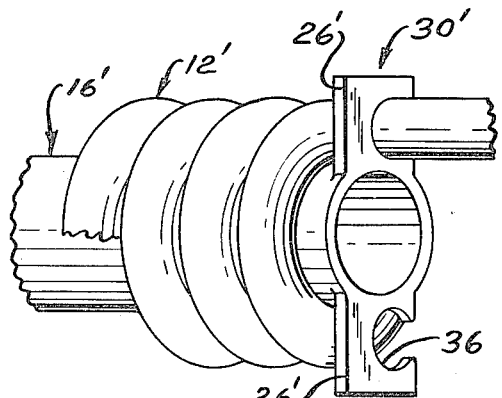

ELECTRICAL UTILITY CORD STORAGE AND SHORTENING DEVICE

BACKGROUND OF THE INVENTION

This invention pertains to a spool-like device and, particularly, a spool-like device which is adapted to facilitate the wrapping, storing, and shortening of utility cord or the like.

Conventional household electrical appliances, such as for example a toaster or blender have ordinarily associated therewith somewhat rather lengthy electrical utility cords of the type which serve to operatively connect a particular appliance to the typical electrical wall socket which supplies current for such appliance. Whenever such applicances are to be situated at a distance from the wall socket which exceeds the length of the cord, electric utility extension cords may additionally be used. In many situations, the generally excessive length of cord extending from the appliance tends to become tangled in a twisted mass which results in certain shortcomings. Foremost among such shortcomings is a likelihood that the relatively thin copper wires embedded within the cord will tend to break with repeated twisting and other forms of flexures, thereby impairing the cord from performing its intended function. Consequently, the cord is often discarded, thusly increasing repair and part replacement costs. In addition, the entangled mass of electrical cord may in certain circumstances create a condition where individuals may damage property and/or person by inadvertently tripping or catching the cord and knocking over the appliance or some other object.

SUMMARY OF THE INVENTION

Accordingly, it is an object of the present invention to provide a device which may be used to overcome the aforedescribed shortcomings encountered with usage of typical electrical utility cords or the like.

It is another object of the present invention to provide a spool-like device which simultaneously serves to store and shorten excessive lengths of utility cord associated with electrical household appliances or the like.

It is another object of the present invention to provide a spool-like device of the aforenoted type which releasably and firmly secures to such a device portions of the utility cord which lead onto and from said device.

It is another object of the present invention to provide a device of the aforenoted character which prevents axial separation of wrapped cord thereabout.

It is another object of the present invention to provide a spool-like device of the above type which has a constructural arrangement that facilitates easy and economical fabrication thereof, and which shortens and adequately stores electrical utility cord or the like in a reliable manner with a relatively simple construction.

Accordingly, therefore, to eliminate the above noted shortcomings and achieve the objects, the present invention contemplates an improved spool-like, cord wrapping device particularly adaptable for wrapping, storing, and shortening utility cord or the like. The spool-like device of the present invention is fabricated from a molded plastic material and has a generally longitudinally extending and generally tubular member with an outer peripheral surface upon which the cord is adapted to be wrapped. In a preferred embodiment, at least one pair of generally transversely extending retaining flanges may be provided which are connected to and located adjacent opposite ends of the generally tubular member so as to project generally radially outwardly therefrom. The distance of radial extension is designed to be sufficient to contain at least one winding of the wrapped coil by preventing the axial separation thereof. At least one releasable fastening member is connected to and preferably located at an end of the tubular member having an opening for holding the cord. Such releasable fastening member includes separated and resilient jaw portions which serve to facilitate the insertion into and removal of the cord from the opening and which act to snap onto and firmly hold the cord to the spool-like device whenever the cord is inserted within the opening.

These and other objects, features, and advantages of the present invention will become apparent from a reading of a detailed description of a preferred embodiment made in accordance with the principles of the present invention when viewed in conjunction with drawings thereof, wherein like reference numerals indicate like structure throughout the several views.

BRIEF DESCRIPTION OF THE DRAWINGS

FIG. 1 is a schematic view illustrating an electrical utility appliance with its cord connected to an electrical wall socket and used in conjunction with the spool-like device embodying the principles of the present invention;

FIG. 2 is a plan view of the spool-like device depicted in FIG. 1;

FIG. 3 is an end view of the spool-like device shown in FIG. 2; and

FIG. 4 is a fragmented perspective view of the spool-like device showing an alternate embodiment of the present invention.

DESCRIPTION OF A PREFERRED EMBODIMENT

Referring now to FIG. 1, the spool-like or cord wrapping device embodying principles of the present invention is indicated generally at 10. As illustrated it has wrapped thereabouts an electrical utility cord 12 of the type normally associated with an electrical appliance, such as a toaster 14 or the like. The spool-like device 10 as depicted serves the purposes of shortening and storing excessive lengths of cord in a neatly arranged and compact fashion as will be subsequently made apparent.

As best depicted in FIG. 2 taken in conjunction with FIG. 3, the spool-like device 10 includes a generally elongated and longitudinally extending main body portion or hub 16 which has an outer peripheral surface 18 and respective opposite end surfaces 20. The outer peripheral surface 18 may be formed in any desired configuration and in the particular embodiment being presently described is generally cylindrical in shape. Preferably, the main body portion 16 is of a tubular construction having a somewhat enlarged diameter bore 22 extending along the longitudinal axis 23 thereof. In having a tubular construction, the weight of the spool-like device 10 as well as the production costs are significantly reduced. The enlarged diameter bore 22 may also serve to facilitate mounting of the device 10 on a suitable elongated member. In the preferred embodiment, the main body portion 16 is desirably made of a suitable lightweight, inexpensive, and flexible molded plastic material which may be easily and economically fabricated. Although, a plastic material may be used, it should be understood that other materials can be used as effectively. The use of plastic additionally serves the purpose of providing a form of electrical insulation in event a frayed electrical cord leaks electrical current. Hence, a safety feature is thus provided which tends to inhibit undesired flow of electrical current. It is of course within the scope of the present invention to have the spool-like device 10 varied in dimension so as to adequately store other kinds of cord or cable.

Retaining means 24 are provided in conjunction with the main body portion 16 and are integrally or otherwise suitably connected to and adjacent respective ends 20 of the main body portion. Each retaining means 24 is preferably but not exclusively limited to pairs of diametrically opposed retaining flanges 26. The retaining flanges 26 extend in a direction generally transversely to and are directed radially outwardly away from the longitudinal axis 23 of the main body portion 16. The free ends 28 of each retaining flange 26 are arranged to terminate at a distance above the peripheral surface 18 so as to contain at least one wrapping of cord 12 thereon by preventing axial separation thereof. It is, however, within the scope of the present invention that retaining flanges 26 may extend to such a radial distance which permits several windings of cord 12 to be adequately contained on the main body portion 16. Although, a pair of retaining flanges 26 are shown at the respective opposite ends 20 of the main body portion 16, it will of course be understood, that any number of flanges may be arranged adjacent these ends or if desired a distance spaced inwardly from such ends 20.

The spool-like device 10 of the present invention is provided with preferably two releasable fastening or clip means, each one of which is generally indicated by reference numeral 30. Each releasable fastening means 30 serves to releasably and firmly secure portions of the cord 12 so as to securely hold the cord thereto and prevent it from being inadvertently unraveled. The releasable fastening means 30 are integrally or otherwise suitably secured to the end surfaces 20 and are located to extend in a direction which is generally parallel to the longitudinal axis of the main body portion 16. Although the releasable fastening means 30 extend in a direction generally parallel to the longitudinal axis 23 they of course may extend radially outwardly from the main body portion 16. The releasable fastening means 30 are to be made of a generally flexible resilient material, such as plastic for purposes to be presently described.

As more particularly noted in FIG. 2, the releasable fastening means 30 is of a generally annular configuration and includes two separated and flexible jaw portions 32 which define an opening 34 appropriately dimensioned to suitably receive therein whatever sized cord 12 is desired to be wrapped about the spool-like device 10. It will thus be understood that whenever it is desired to insert a portion of the cord 12 into the releasable fastening means 30, one merely has to push the cord between the jaw portions 32 so that their inherent resiliency will cause them to separate a distance sufficient to accommodate passage of the cord to the opening 34. Thereafter, the jaw portions 32 will resiliently snap around the cord 12 to firmly hold the cord to the spool-like device 10 and, thereby prevent any unraveling of such cord. To remove the cord 12 it will be apparent that one need only to pull such cord from the opening 34 and the arm portion 32 will by reason of their inherent resiliency again separate to facilitate a quick and easy release from the releasable fastening means 30.

Although a generally integrally formed releasable fastening means 30 has been presently disclosed, it is well within the scope and spirit of the present invention to utilize other known types of releasable fastening device which may serve to releasably and securely hold the cord 12 or the like onto the spool-like device 10.

In the aforenoted constructional arrangement by having a spool-like device 10 which includes retaining means 24 that serve to contain the cord 12 thereon in a wrapped fashion and clip means 30 which serve to releasably secure the utility cord thereto, applicant has been enabled to achieve a shortening and facilitate a storing of the cord in a reliable manner with a relatively simple construction which may be easily fabricated at low cost.

Specifically referring to FIG. 4, there is depicted an alternate embodiment of the releasable fastening means being generally indicated by reference numeral 30'. The particular embodiment illustrates that the releasable fastening means 30' includes an aperture 36 formed in one of the retaining flanges 26'. Aperture 36 is appropriately dimensioned to snuggly and releasably receive cord 12' so that when the cord is inserted therein, the aperture provides for a snubbing action on the cord so as to hold it in place. It is desirable, of course, to have the retaining flanges 26' made from a flexible plastic material so as to facilitate the insertion and removal of cord 12. Additionally, aperture 36 may also be effectively formed in one end of main body portion 16' to provide for a similar type snubbing action on the cord.

While the particular embodiments of the present invention have been disclosed and described, it will be obvious to those skilled in the art that changes and modifications may be made thereto without departing from the invention in its broader aspects and therefore the aim in the appended claims is to cover all such changes and modifications as fall within the scope of the invention.

The invention claimed is:

1. A spool-like device adapted for use in wrapping, storing, and shortening utility cord or the like comprising a generally longitudinally extending tubular member having an outer peripheral surface upon which the cord is adapted to be wrapped, at least one pair of generally transversely extending retaining flanges connected to and located adjacent opposite ends of said tubular member and projecting generally radially outwardly from said outer peripheral surface by a distance sufficient to contain at least one winding of the wrapped cord by preventing axial separation thereof, and resilient clip means connected to and located at each said ends of said tubular member having separated jaw portions which partially define an opening for the cord and which snap about the cord whenever the cord is inserted into said opening to firmly hold the cord against unwrapping about said tubular member.

2. A device adapted for storage and shortening of an electrical utility cord as utilized by household electrical appliances, said device comprising a spool-like member of molded plastic material having an intermediate hub about which a length of utility cord is wrapped and integral retaining flanges at opposed ends of the hub which project radially therefrom to contain at least one wrapping of the utility cord and restrain it against axial separation from the hub, said spool-like member further having fastening means at each end of the hub in the form of end-separated integral jaw portions which define openings with a restricted mouth for releaseably receiving the portions of the utility cord leading to and from its wrapped portion, said jaw portions being flexible to accommodate passage of the cord portions into said openings through the mouth thereof and thereafter to resiliently snap around the cord portions and firmly hold the cord to the spool-like member and against unwrapping from the hub.

3. The device of claim 2 wherein the fastening means comprise integral parts of the retaining flanges.

4. The device of claim 2 wherein the fastening means comprise annular clip portions at the ends of the hub which extend generally parallel to the longitudinal axis of the hub.

* * * * *